March 5, 1957  L. F. KUTIK  2,783,501
APPARATUS FOR MOLDING PLASTIC MATERIAL
Filed Aug. 26, 1953  3 Sheets-Sheet 1

INVENTOR.
Louis F. Kutik
BY
Alfred W. Nibber
ATTORNEY

March 5, 1957 L. F. KUTIK 2,783,501
APPARATUS FOR MOLDING PLASTIC MATERIAL
Filed Aug. 26, 1953 3 Sheets-Sheet 2
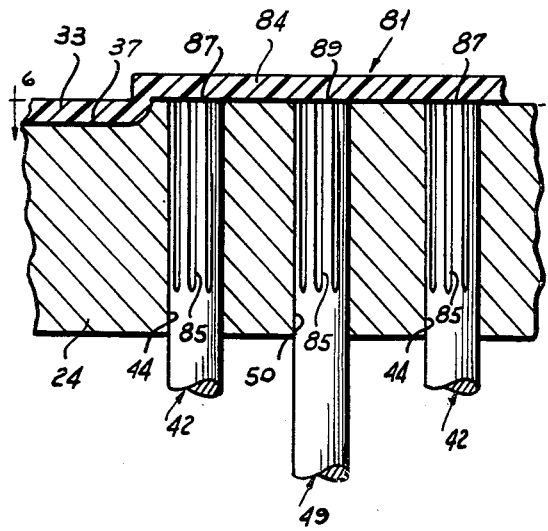
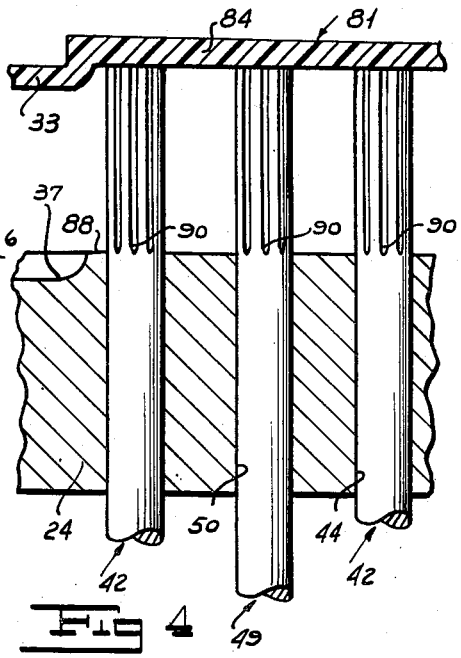
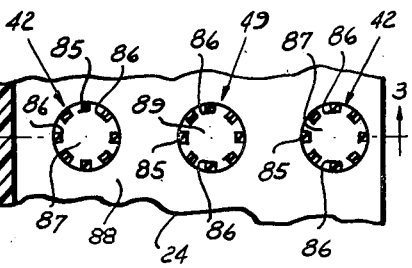
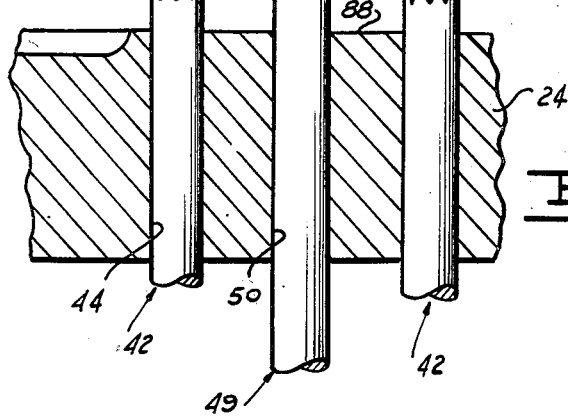
INVENTOR.
LOUIS F. KUTIK
BY
ATTORNEY March 5, 1957 L. F. KUTIK 2,783,501
APPARATUS FOR MOLDING PLASTIC MATERIAL
Filed Aug. 26, 1953 3 Sheets-Sheet 3

INVENTOR.
Louis F. Kutik
BY
Alfred W. Nibber
ATTORNEY

United States Patent Office 2,783,501
Patented Mar. 5, 1957

2,783,501

APPARATUS FOR MOLDING PLASTIC MATERIAL

Louis F. Kutik, Preakness, N. J.

Application August 26, 1953, Serial No. 376,592

9 Claims. (Cl. 18—42)

This invention relates to an improved apparatus for molding plastic material. The invention is particularly concerned with improvements in the ejection of molded shapes from molds, and in ejection mechanism for molds wherein the molded part has a large area of engagement with the mold cavity. The invention is of particular advantage in molds wherein a portion of the mold cavity is formed between reciprocable pins or elongated members and the bores in a mold part in which such members are located.

Plastic molding devices, particularly of the injection type, conventionally employ a multi-part mold wherein the mold parts are separable to allow the ejection of the molded plastic article. Usually, to aid in freeing such molded article from the mold cavity, one of the mold parts contains a larger part of the cavity than the other, whereby upon separation of the mold parts the molded plastic article tends to remain in the mold part containing the larger part of the cavity. To free the molded part from such last named mold part it has been customary to provide such mold part with ejector or knockout pins to thrust the molded article outwardly of the mold part upon separation of the two parts of the mold.

Where the molded part is of simple contour, and the number of ejector pins is small, a molded part will usually fall off the ends of the outthrust ejector pins so that it is necessary for the operator merely to remove it from between the dies. In some instances a chute is provided below the dies so that the operator does not have to perform even such step of removal of the parts. Where, however, the molded part is of intricate contour so that the ejector pins must exert very substantial pressure on it to free it from the mold part, marked adherence is developed between the ends of the ejector pins and the molded article. In such case the operator must reach in between the two mold parts, when they are separated, and manually free the molded article from the ends of the ejector pins.

The apparatus of the invention is particularly useful in the molding of plastic articles wherein the engagement between the ejector and/or molding pins and the molded article is such that the molded article is not readily freed from such pins. The invention finds its greatest usefulness in molds wherein at least some of the pins or elongated members, functioning as ejector pins, also serve as "molding pins," that is, they, together with the bore in the mold in which they reciprocate, present molding recesses in communication with the main cavity of the mold, and thus retain engagement with the molded article over a substantial area after the reciprocable pins or elongated members have travelled out of the mold block. A perhaps extreme example of such latter type of article is a brush element wherein the backing element and the bristles of the brush are molded integral, the bristles being formed in a plurality of elongated narrow recesses formed by flutes on the side walls of a plurality of elongated members, each of which is reciprocable in a bore in a mold part. The present invention is disclosed hereinafter in an embodiment thereof for molding such integral brush element, although it is apparent from the above that the invention is not limited to such application.

The invention has among its objects the provision of an improved molding apparatus for plastic material, such molding apparatus being characterized by the ease and efficiency of the ejection of the molded body from the mold without undue localized strain on such body.

A further object of the invention resides in the provision of molding apparatus for plastic material wherein a plurality of ejector pins are employed in a mold part, and means is provided for progressively freeing the molded article from the mold part and from a major portion of the ejector pins.

In specific embodiments thereof the invention relates to improved molding apparatus for plastic material wherein a portion of the cavity in the mold is presented between the elongated pins, employed for ejection of the molded part, and the bores in the mold in which they reciprocate, the apparatus of the invention progressively positively freeing the molded article from the mold part and from a major portion of such reciprocable molding and ejecting pins.

My invention is clearly defined in the appended claims. Where parts are for clarity and convenience referred to on the basis of their oriented position shown in the accompanying drawings, no limitation as to the positioning of the structure, of the press, and of the mold is to be implied, since it will be understood that the press and mold may be placed in any position by suitable modification of the means for feeding plastic material to the mold and of the lost motion connections between the parts, at least some of which in the illustrated embodiment depend upon gravity for their return. Also, in both the description and the claims, parts at times may be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

In Fig. 1 the mold parts are shown closed preparatory to receiving a charge of plastic material.

In Fig. 2 the molded parts are shown in fully raised, ejected position.

Fig. 3 is an enlarged fragmentary view in transverse section through the lower part of the mold of the invention, the bristle forming and ejector pins being shown in elevation, the section being taken along the line 3—3 in Fig. 6.

Fig. 4 is a view similar to Fig. 3, but with all such pins elevated to occupy the upper terminal position of the first portion of the ejecting travel of such pins, the upper ends of the "short" and the "long" pins being located at the same level.

Fig. 5 is a view similar to Fig. 4, but with the "short" and "long" pins at the upper terminus of their travel, the "long" pins having their upper ends lying markedly above those of the "short" pins.

Fig. 6 is a fragmentary view in horizontal section through the mold structure and the molded part shown in Fig. 3, the section being taken along the line 6—6 in Fig. 3.

Figure 1:
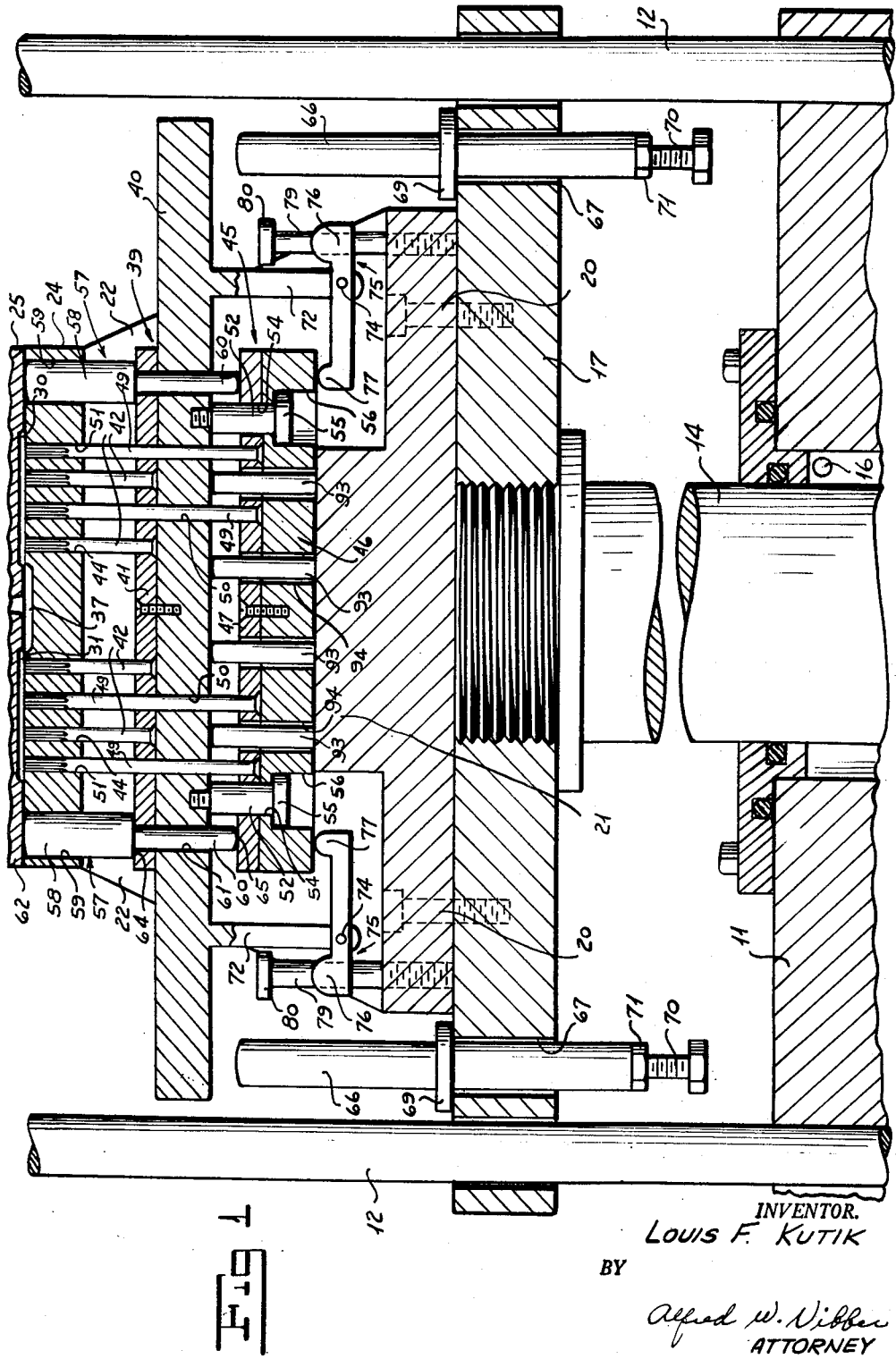
Fig. 1 is an enlarged fragmentary view, partly in elevation and partly in section generally axial of the press ram of the apparatus, such view being taken in the vicinity of the mold of the invention.
Figure 2:
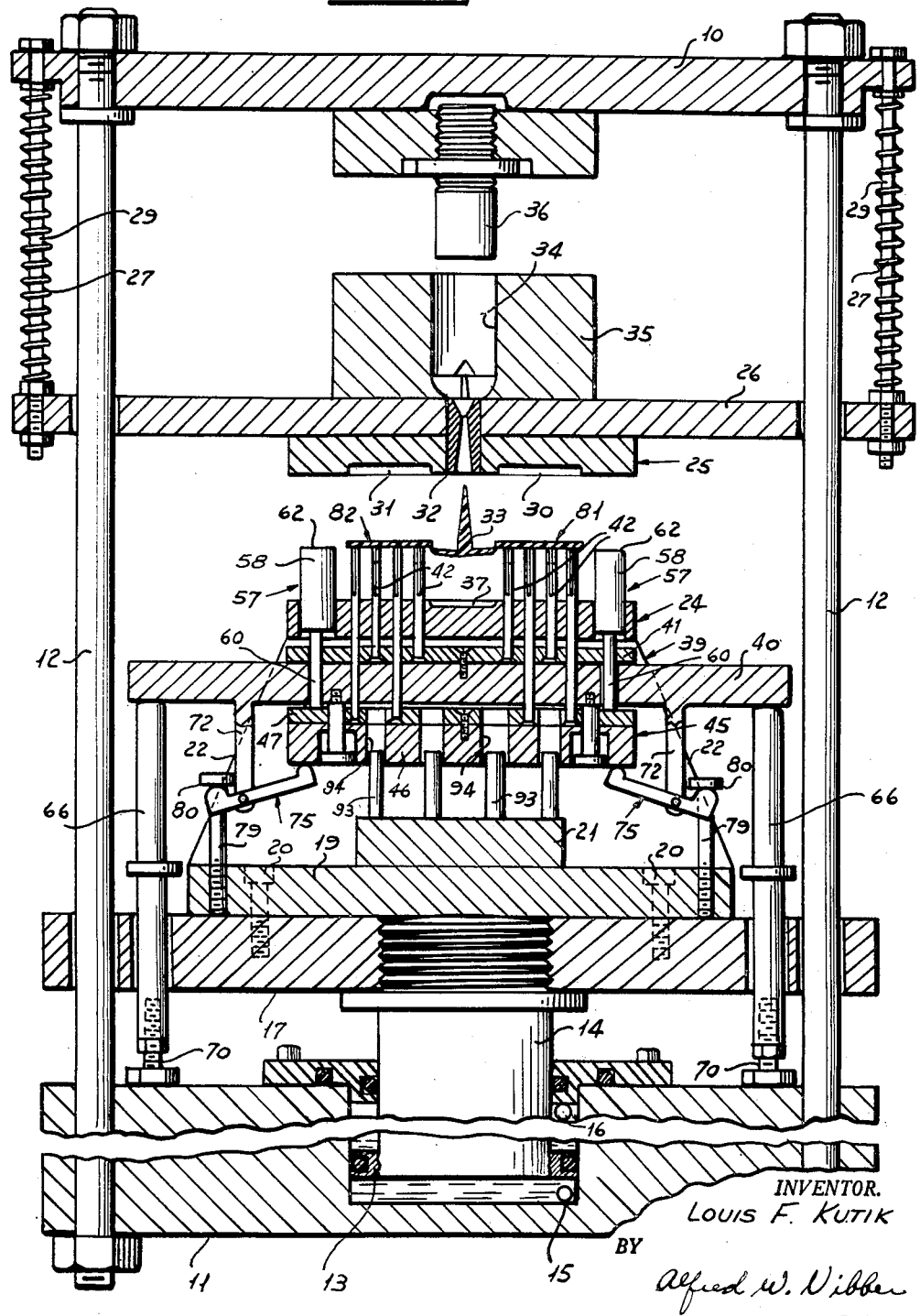
Fig. 2 is a fragmentary view, partially in elevation and partially in section generally axially of the injection molding plunger of an injection molding machine in accordance with the invention, such machine incorporating the mold of the invention.

In Figs. 1 and 2 there is shown a portion of a conventional injection molding machine for plastic materials, such machine incorporating a mold and a molded article ejecting means made in accordance with a preferred embodiment of the present invention. The molding machine there shown incorporates two relatively fixed heads or cross members, the upper head 10 and the lower head or bed 11. Members 10 and 11 are held parallel with respect to each other by means of a plurality of tie and guide rods, of which two are shown at 12. Projecting centrally through the bed 11 is the piston rod 14 of a double-acting ram, which positively thrusts the rod 14 upwardly when fluid is admitted through port 15 to act upon the bottom of the piston 13 thereof, and which is positively retracted when fluid is admitted through the port 16 to act upon the top of the piston. To the upper end of piston rod 14 there is secured, as shown, the ram head 17 so as to reciprocate therewith. Such ram head has secured thereto by the studs 20 the thrust plate 19 which has a large central boss 21 thereon. Integrally connected with the thrust plate 19, as indicated in Figs. 1 and 2, are two spaced parallel keystone shaped guide plates 22, one of which is shown in Figs. 1 and 2. Connected to the upper ends of guide plates 22 is the lower or first mold part 24. Thrust plate 19 thus serves as a means of connecting mold part 24 rigidly to the crosshead 17. The mounting of such mold part on the spaced parallel plates 22 allows the mounting of reciprocable pin-mounting plate structures 39 and 45, respectively holding the first (short) and second (long) set of ejector pins, between the mold part 24 and thrust plate 19. Further, in this instance, the inner surfaces of plates 22 serve as guides for such pin-mounting structures.

The injection molding machine, as shown in Fig. 2, is further provided with a reciprocable crosshead 26, such crosshead having connected thereto the upper mold part 25. Crosshead 26 is strongly thrust into the position shown in Fig. 1 by means of the compression springs 27 which, as shown, are positioned about the tie rods 29 which connect crosshead 26 with the upper fixed crosshead 10, thereby to limit travel of head 26 downwardly. It will be apparent that, when piston rod 14 is impelled vertically, the lower mold part 24 is thrust forcibly into contact with the upper mold part 25, whereby a closed molding cavity is formed therebetween. The mold shown herein provides two cavities 30 and 31 in upper mold part 25 for the formation of two backing elements for brush parts, the bristles on such two backing elements being formed along the plurality of molding and ejector pins reciprocably mounted in the lower mold part 24, in a manner to be described.

The two mold cavities provided between the mold parts 24 and 25 are supplied with plasticized plastic material, which has been placed in the plastic material receiving cavity 34 of the injection pot structure 35, by reason of entry of the injection plunger 36 into cavity 34 after the mold part 24 has been raised to contact mold part 25 and the crosshead 26 has been lifted against the action of the springs 27, as above described. The conventional gate 37, formed in mold part 24, communicates with injection nozzle 32 so as to form the sprue 33 therewith, as shown in Fig. 2. Such sprue is broken off from the two molded brush parts along the weakened section thereof shown in cross section in Fig. 6.

In a typical mold for making brush parts for nail brushes the tuft-like groups of bristles integral with the brush backing element are arranged in rows at right angles to each other, there being ten of such groups laterally of the brush part and twenty-eight longitudinally thereof, giving a total of 280 tuft-like groups of molded bristles. As indicated in Fig. 6, the bristles are formed by being molded between flutes 86 on the side surfaces of the molding and ejecting pins 42, 49 and the bores in the mold part in which such pins reciprocate. In the pin construction shown, eight such flutes are employed on each pin, the flutes being equally spaced around the surface of each pin. Thus with the typical brush under consideration, there is a total of 2,240 bristles which are formed integral with the backing element of the brush in one injection molding operation. It will be appreciated that the adhesion between such bristles and the mold cavity forming parts of the mold is considerable. It will also be appreciated that, in order to produce satisfactory brushes, it is desirable not to injure any of the bristles when freeing the brush part from the mold part 24 and also from the molding and ejecting pins. The apparatus and method of the present invention are designed to accomplish such freeing of the molded brush part or the like from the molding parts of the mold in such a manner that a major portion of the surface of the article is automatically freed from the molding surfaces, the portion of the article remaining in adherence with parts of the mold being small enough so that the molded part may readily be removed therefrom manually without injury to the molded article.

For ease of illustration, the molding and ejecting pins of the invention have been exaggerated in size and greatly decreased in number. Also for simplicity, although both mold parts 24 and 25 are preferably chambered and supplied with temperature controlling fluid such as water or oil, none of the chambers in mold parts 24 and 25 nor the source of supply of temperature controlling fluid is shown.

As shown in Figs. 1 and 2, the lower mold part 24 is provided with a plurality of first, short pins 42 and a plurality of second, long pins 49. The pins of each set are preferably spaced as uniformily as possible over the area of the cavity 30, there being, in the mold for making the specific nail brush discussed, 269 first or short pins 42 and 11 second or long pins 49. As a result of this construction, as will be seen hereinafter, the stresses imposed upon the brush element upon the ejection thereof are not unduly large at any time and are distributed substantially uniformly over its backing element. The first, short, pins 42 have their bottom ends held in a retaining plate structure generally designated 39, structure 39 being made up of a large lower plate 40 extending substantial distances laterally, and a smaller upper plate 41, the headed lower ends of pins 42 being retained between such plates, which are secured together by machine screws. The second, long, pins 49 are held at their bottom ends in a retaining plate structure generally designated 45, such structure being made up of the lower plate 46 and the upper plate 47 retained together by screws, as shown, and securing the lower headed ends of pins 49 therebetween. The pins 42 reciprocate in bores 44 in mold part 24, which they accurately fit. The pins 49 likewise reciprocate in bores in mold part 24, such bores being designated 51, and also in bores 50 in the plate structure 39, which, as shown, is interposed between the mold 24 and the retaining plate structure 45 for the longer pins.

The two pin retaining structures above described are guided laterally by the above discussed side plates 22, the edges of the structures sliding along the inner surfaces of plates 22. Structure 45 is connected to structure 39 by a lost-motion connection allowing limited relative reciprocation between the two pin holding structures, such means taking the form of studs 52 affixed to the lower surface of plate 40, the head 55 of each stud travelling in a counterbore 56 in plate 46. When pin retaining structure 45 has descended relative to structure 39 so that the heads 55 of the studs 52 contact the upper surface of the counterbore, the upper ends 87 and 89 of the pins 42 and 49, respectively, all lie in a common plane, and in this instance, lie flush with the upper surface of the mold part 24, as shown in Fig. 1. When, however, structure 45 begins to approach plate 40, the longer pins 49 will have their upper ends 89 elevated above the upper ends 87 of the shorter pins, thereby to begin the operation of substantially freeing the molded bristles from the flutes in the first pins 42, as will be discussed more fully in connection with Figs. 3–6, inclusive.

The mold as shown in Fig. 1 is in the condition it assumes just prior to the injection of the plastic material thereinto. As shown, the mold parts 24 and 25 are tightly in contact, and the pins 42 and 49 lie so that their upper ends are flush with the upper surface of part 24. Such initial placement of the sets of pins 42 and 49 is accomplished by the thrusting downwardly of the return pins 57 by the upper mold part 25 upon the closing of the mold. Each of pins 57 has an upper large portion 58 which is reciprocable in the bore 59 in mold part 24. The bottom portion 60 of the return pin is of smaller diameter, and is received in the bore 61 in plates 40 and 41 of the first pin retaining structure, the lower end 65 of lower portion 60 of each pin contacting the upper surface of plate 47 of the second pin retaining structure 45. The shoulder between the upper and lower parts of return pin 57, designated 64, engages the upper surface of plate 41 of pin retaining structure 39.

As evident in Fig. 1, the lengths of the two portions 58 and 60 of the return pin 57 and the relative effective lengths of pins 42 and 49 as held in their pin retaining structures are such that, when the mold parts are closed tightly together, shoulder 64 of the return pins will thrust pin retaining structure 39 down far enough to bring the upper surfaces 87 of pins 42 flush with the upper surface of mold 24, so that the lost-motion connection between the structures 39 and 45 will have been entirely taken up, that is, so that the head 55 of the studs 52 will contact the upper surface of the counterbore 56, and so that the upper surfaces 89 of pins 49 will also lie flush with the upper surface of mold part 24.

In order to support mold part 24, particularly beneath the mold cavities, against the large thrust to which it is subjected when plastic material is injected into the mold, a series of pins 93 (four shown) are provided. Pins 93 slide freely in bores 94 in plates 46 and 47, and rest upon the upper surface of boss 21. The pins are of such length that when the mold is closed the upper ends of the pins contact the lower surface of plate 40. A slight gap, on the order of .002", between the tops of the pins and the bottom of plate 40 may be provided in a mold with the usual tolerances when it is closed and with the tops of pins 42 and 49 lying flush with the top of mold part 24. Upon the injection of plastic material into the mold the pressure of the plastic material upon the pins 42 will thrust the plate 40 down upon the pins 93 to cause them to sustain their portion of the thrust.

Laterally outward of the mold, the reciprocable crosshead 17 carries the knockout pins 66 freely reciprocable in bores 67 in the crosshead, the knockout pins being retained in the position shown in Fig. 1 when the mold is closed by the collars 69 which rest upon the crosshead 17. Each of the knockout pins is provided with an adjustable stud 70 on the lower end thereof, such stud being held in adjusted position by the lock nut 71. The adjustment of studs 70 allows the adjustment, within limits, of the position of retraction of the crosshead 17, and thus of the mold part 24, at which the two sets of pins 42 and 49 begin to travel outwardly of mold part 24 to eject the molded articles. The mold of the invention is provided with a further lost-motion connecting means between the first pin retaining structure 39 and the second pin retaining structure 45 whereby, upon a predetermined degree of travel of both sets of pins together outwardly of the mold, said lost-motion connecting means functions to advance the second set of pins outwardly of the mold at a faster rate than the first set and also to a greater distance. Said lost-motion connecting means takes the form of at least one pair of opposed depending bifurcated supports 72 on plate 40, each support 72 pivotally mounting on pivot pin 74 a first-class lever generally designated 75. The outer, shorter, forked end 76 of each such lever embraces the shank of the upstanding stud 79 affixed to the thrust plate 19, end 76 of the lever being freely reciprocable along the shank of such stud until it contacts the head 80 of the stud. The longer, inner arm 77 of each lever 75, which is approximately of twice the length of the end 76, extends inwardly into the path of the plate 46 of the second pin retaining structure 45. The distance of the pivot pin 74 from the plate 40 of the first pin retaining structure, the relative lengths of the arms of lever 75, and the difference in level of the bottom surface of the plate 46 and the bottom surface of head 80 of stud 79 are such that the lost-motion means 72, 75, etc. does not come into play upon retraction of the mold part 24 downwardly and upon actuation of the two pin sets by the knockout pins 66 until the lower end of the molded article has been freed from mold part 24, as shown in Fig. 4. At such point, crosshead 17 and thrust plate 21 will have descended vertically sufficiently for the heads 80 of the stud 79 to contact ends 76 of the levers 75. At this juncture plate 40 is, of course, held stationary in space by the pins 66, the mold part 24 having been travelling downwardly with respect to the set of pins 42, which have been held fixed by the retaining structure 39, and the pins 49, which have been held by structure 45, which in turn was held from downward travel by the studs 52 positioned as in Fig. 1. Further downward travel of the studs 80 causes the outer ends of the levers 75 to travel downwardly and thus the inner ends 77 of the levers to travel upwardly and to carry structure 45 with them. The lost-motion connection 52, 55, 56 allows structure 45 to travel upwardly with respect to structure 39, so that the upper ends of pins 49 lie markedly above the ends of pins 42 in the terminal position of outward travel of the pins shown in Fig. 5.

When the position of the molded part relative to the mold and the pins therein shown in Fig. 5 has been reached, the bristles 85 will have been moved substantially relative to pins 42 and substantially freed therefrom, the only effective tendency to seal between the molded brush part and the mold parts being that present between the bristles 85 and the flutes on the long pins 49. Since such long pins 49 are relatively few in number, however, the operator can readily free the brush from pins 49 and thus remove it from between the mold parts without injury to the brush. With the typical nail brush above discussed the bristles adhere to each of the pins 42, 49, when they are thrust outwardly to the position shown in Fig. 4, with a force on the order of one pound per pin. Thus it would then take a force of approximately 280 pounds to pull the brush element off the pins. This, of course, is an impossible task for an operator. When the long pins have substantially freed the bristles from the short pins, as shown in Fig. 5, however, only the 11 long pins remain adhered to their bristles. The operator then has merely to free the brush element from the long pins, which requires a pull on the brush element longitudinally of the pins of not much if any in excess of 11 pounds.

It will be understood that in the molding of some articles it will not be necessary for all of the ejector pins to function as molding members as well. Thus in toothbrushes the tuft-like groups of bristles are spaced more widely than they are in nailbrushes, the spaces being sufficient to receive plain ejector pins. In this case the long pins can all be plain, non-molding, pins placed between the tuft-like groups of bristles molded by the short pins. When a brush of this type is ejected from the mold, upon the travel of the long pins to their outer terminus relative to the mold part the brush will practically fall away from the mold.

The operation of the above described molding apparatus, including the mold and the means for ejecting the molded part therefrom, of the invention will be clear from the above description of the structure shown in Figs. 1 and 2. Such method, however, will be described briefly, particularly in connection with Figs. 3–6, inclusive.

Assume that the two mold parts 24 and 25 are in contact with each other, as shown in Fig. 1, and that the ram 14 has thrust the lower mold part upwardly to inject plastic material into the mold cavities. Thereupon the apparatus after a suitable interval of time will automatically reverse the action of the ram 14 to retract the mold part 24 from the upper part 25. Before the mold and the pin retaining plates thereof have travelled downwardly far enough for the bottoms of studs 70 to contact the bed 11 and for the plate 40 to contact the upper ends of knockout pins 66, the pins 42 and 49 will have the relationship relative to mold part 24 and the molded brush part 81 shown in Fig. 3. When studs 70 contact bed 11 and the plate 40 contacts the upper ends of pins 66, the two sets of pins 42 and 49 begin to rise as a whole relative to the mold part 24, since the pins are held stationary while the mold part 24 travels downwardly. In such first portion of the ejecting travel of the pins, such pins all travel together relative to mold part 24 at the same speed. This condition obtains until the bottom ends 90 of the bristles 85 lying in the flutes 86 of all the pins 42, 49 have at least slightly cleared the upper surface 88 of the mold part 24. This is the condition shown in Fig. 4.

The motion multiplying, lost-motion connection between the two pin retaining structures now comes into play. The head 80 of the downwardly travelling stud 79 contacts its respective lever end 76 so that the inner end of arm 77 thereof, which is considerably longer than arm 76, will be thrust upwardly against the bottom surface of plate 46, thus to thrust pins 49 outwardly of mold part 24 at a rate faster than pins 42 relative to such mold part. Substantially the terminal position of such relative travel of the pin retaining structures is shown in Fig. 2, wherein the upper surface of plate 47 is approaching the lower surface of plate 40. In such terminal position of travel of the pins 42 and 49 relative to mold part 24, the bristles 85 molded along the pins 42 will have been pulled therealong, substantially to free them from any adherence to such pins. The only portion of the brush remaining adhered to a mold part are those bristles 85 which have been molded in the flutes on pins 49, as shown in Fig. 5. Because of the relatively few pins 49, however, as above explained, the brush 81 may readily be removed without injury thereto when it has reached the position relative to the mold shown in Fig. 5.

Whereas for purposes of illustration I have shown and described a preferred embodiment of the apparatus for molding plastic material of my invention, it will be understood, that within the scope of the invention such apparatus may be varied considerably as to details. Accordingly the invention is not to be limited to such described embodiments, but rather is to be defined by the scope of the claims appended hereto.

I claim as new the following:

1. A mold for a brush part having a backing element and bristles integral therewith which comprises a mold having a main, backing element forming, cavity therein, said mold being formed of at least two parts separable to allow withdrawal of the molded brush part, a plurality of elongated members accurately fitting within and reciprocable in bores in a first one of said mold parts, each elongated member having a plurality of longitudinally disposed flutes on its side surface, means to hold the elongated member in the bore in such first mold part with the ends of the flutes remote from the main mold cavity positioned within the bore in the first mold part, thereby forming bristle forming cavities with closed bottoms between the surfaces of the flutes and the bore in the first mold part, said elongated members comprising at least two sets, the elongated members in each set being distributed generally over the area of the brush backing element, and means to thrust the elongated members of both sets outwardly of the first mold part to eject the brush part therefrom upon the separation of the mold parts, said last named means including means for thrusting the elongated members of both sets outwardly substantially the same distance during the initial part of the ejecting portion of the cycle of motion of the elongated members, and means for thrusting the elongated members of one set together the same distance further outwardly than the elongated members of the other set in a later part of such ejecting portion of the cycle of motion of the elongated members.

2. Apparatus for molding plastic material comprising a mold having at least two parts movable toward and away from each other, the parts providing a mold cavity between them when they are together and allowing ejection of the molded part from such cavity when they are apart, a plurality of ejector pins reciprocable in bores in a first one of said mold parts, said bores communicating with the mold cavity, said ejector pins comprising at least two sets of pins, the pins in each set being distributed generally over the area of the molded part, power operated means for selectively moving the mold parts toward and away from each other, the first mold part being mounted on a crosshead actuated by the last named means, a first reciprocable plate mounted to confront the side of the first mold part opposite the mold-cavity-forming side thereof, the first plate connecting the pins in the first set, a second reciprocable plate mounted beyond the first plate and connecting the pins in the second set, means actuated upon a predetermined retraction of the crosshead and first mold part to hold the two plates stationary while the first mold part continues to travel thus to thrust the two plates relatively toward the first mold part and the ejector pins of both sets outwardly of the first mold part to eject the molded part therefrom upon the separation of the mold parts, and means actuated upon a predetermined projection of all the ejector pins to thrust the second plate toward the then stationary first plate thus to project the pins of the second set further than those of the first set outwardly of the mold.

3. Apparatus for molding plastic material comprising a mold having at least two parts movable toward and away from each other, the parts providing a mold cavity between them when they are together and allowing ejection of the molded part from such cavity when they are apart, a plurality of ejector pins reciprocable in bores in a first one of said mold parts, said bores communicating with the mold cavity, said ejector pins comprising at least two sets of pins, the pins in each set being distributed generally over the area of the molded part, power operated means for selectively moving the mold parts toward and away from each other, the first mold part being mounted on a crosshead actuated by the last named means, a first reciprocable plate mounted to confront the side of the first mold part opposite the mold-cavity-forming side thereof, the first plate connecting the pins in the first set, a second reciprocable plate mounted beyond the first plate and connecting the pins in the second set, the pins held by the second plate extending through the first plate, a lost-motion means interposable directly between the first plate and a fixed part of the apparatus to hold the two plates stationary while the first mold part continues to travel thus to thrust the ejector pins of both sets outwardly of the first mold part to eject the molded part therefrom upon the separation of the mold parts, and means including a lost-motion connection between the first and second plates and actuated upon a predetermined projection of all the ejector pins to thrust the second plate toward the then stationary first plate to project the pins of the second set further than those of the first set outwardly of the mold.

4. Apparatus for molding plastic material comprising a mold having at least two parts movable toward and away from each other, the mold parts providing a mold cavity between them when they are together and allowing ejection of the molded part from such cavity when they are apart, a power driven reciprocable crosshead mounting one of the mold parts for selectively moving such parts toward and away from each other, a plurality of ejector pins reciprocable in bores in a first one of said mold parts, said bores communicating with the mold cavity, said ejector pins comprising at least two sets of pins, the pins in each set being distributed generally over the area of the molded part, substantially all of the pins of both sets having at least one plastic material molding recess in their side surfaces, means connecting the pins of the first set to move in unison, means connecting the pins of the second set to move in unison, means actuated upon a predetermined retraction of the crosshead and thus of the first mold part relative to hold the two plates stationary while the first mold part continues to travel thus to the second to project the pins of both sets together from the first mold part, and means actuated upon the projection of those pins having plastic material molding recesses in their side surfaces to such distance that they clear the first mold part to thrust the second plate toward the then stationary first plate thereby to thrust the pins of the second set further outwardly of the first mold part than the pins of the first set.

5. Apparatus for molding plastic material comprising a press having a fixed framework, a mold having at least two parts movable toward and away from each other, the parts providing a mold cavity between them when they are together and allowing ejection of the molded part from such cavity when they are apart, a power operated crosshead mounting one of the mold parts for selectively moving the mold parts toward and away from each other, a plurality of ejector pins reciprocable in bores in a first one of said mold parts, said bores communicating with the mold cavity, said ejector pins comprising at least two sets of pins, the pins in each set being distributed generally over the area of the molded part, a first pin plate connecting the pins of the first set, a second pin plate connecting the pins of the second set, the two pin plates and their pins being capable of limited independent reciprocating motion relative to each other, a first lost-motion connection between a stationary part of the framework of the apparatus and the first pin plate whereby upon a predetermined retraction of the crosshead the pins of the first set are thrust outwardly of the first mold part, a second lost-motion connection between the first pin plate and the second pin plate whereby ejecting motion of the first pin plate causes an equal motion in the same direction of the second pin plate, and a third lost-motion, motion-multiplying connection between the first pin plate and the second pin plate whereby upon a predetermined distance of travel of both sets of pins outwardly of the mold said last named connection causes the pins of the second set to be thrust further outwardly than the pins of the first set.

6. Apparatus for molding plastic material comprising a press having a fixed framework, a mold having at least two parts movable toward and away from each other, the parts providing a mold cavity between them when they are together and allowing ejection of the molded part from such cavity when they are apart, a power operated crosshead mounting one of the mold parts for selectively moving the mold parts toward and away from each other, a plurality of ejector pins reciprocable in bores in a first one of said mold parts, said bores communicating with the mold cavity, said ejector pins comprising at least two sets of pins, the pins in each set being distributed generally over the area of the molded part, at least some of the pins of the first set having a plurality of longitudinally disposed plastic material molding flutes on their side surfaces, the channels formed by said flutes and the bores in which the pin is mounted communicating with the mold cavity when the mold parts are together, a first pin plate connecting the pins of the first set, a second pin plate connecting the pins of the second set, the two pin plates and their pins being capable of limited independent reciprocating motion relative to each other, a first lost-motion connection between a stationary part of the framework of the apparatus and the first pin plate whereby upon a predetermined retraction of the crosshead the pins of the first set are thrust outwardly of the first mold part, a second lost-motion connection between the first pin plate and the second pin plate whereby ejecting motion of the first pin plate causes an equal motion in the same direction of the second pin plate, and a third lost-motion, motion-multiplying connection between the first tin plate and the second pin plate whereby upon a predetermined distance of travel of both sets of pins outwardly of the mold said last named connection causes the pins of the second set to be thrust further outwardly than the pins of the first set.

7. Apparatus for molding plastic material comprising a press having a fixed framework, a mold having at least two parts movable toward and away from each other, the parts providing a mold cavity between them when they are together and allowing ejection of the molded part from such cavity when they are apart, a power operated crosshead mounting one of the mold parts for selectively moving the mold parts toward and away from each other, a plurality of ejector pins reciprocable in bores in a first one of said mold parts, said bores communicating with the mold cavity, said ejector pins comprising at least two sets of pins, the pins in each set being distributed generally over the area of the molded part, a first pin plate connecting the pins of the first set, a second pin plate connecting the pins of the second set, the two pin plates and their pins being capable of limited independent reciprocating motion relative to each other, a first lost-motion connection between a stationary part of the framework of the apparatus and the first pin plate whereby upon a predetermined retraction of the crosshead the pins of the first set are thrust outwardly of the first mold part, a second lost-motion connection between the first pin plate and the second pin plate whereby ejecting motion of the first pin plate causes an equal motion in the same direction of the second pin plate, and a third lost-motion, motion-multiplying connection between the first pin plate and the second pin plate whereby upon a predetermined distance of travel of both sets of pins outwardly of the mold said last named connection causes the pins of the second set to be thrust further outwardly than the pins of the first set, the third lost-motion connection comprising at least one first-class lever pivoted on the first pin plate, one end of the lever lying beneath the second pin plate, and a stop means attached to the crosshead adapted to contact the other end of the lever upon a predetermined retraction of the crosshead relative to the first pin plate.

8. Apparatus for molding plastic material comprising a press having a fixed framework, a mold having at least two parts movable toward and away from each other, the parts providing a mold cavity between them when they are together and allowing ejection of the molded part from such cavity when they are apart, a power operated crosshead mounting one of the mold parts for selectively moving the mold parts toward and away from each other, a plurality of ejector pins reciprocable in bores in a first one of said mold parts, said bores communicating with the mold cavity, said ejector pins comprising at least two sets of pins, the pins in each set being distributed generally over the area of the molded part, a first pin plate connecting the pins of the first set, a second pin plate connecting the pins of the second set, the two pin plates and their pins being capable of limited independent reciprocating motion relative to each other, a first lost-motion connection between a stationary part of the framework of the apparatus and the first pin plate whereby upon a predetermined retraction of the crosshead the pins of the first set are thrust outwardly of the first mold part, a second lost-motion connection between the first pin plate and the second pin plate whereby ejecting motion of the first pin plate causes an equal motion in the same direction of the second pin plate, and a third lost-motion connection between the first pin plate and the second pin plate whereby upon a predetermined distance of travel of both sets of pins outwardly of the mold said last named connection causes the pins of the second set to be thrust further outwardly than the pins of the first set.

9. Apparatus for molding plastic material comprising a press having a fixed framework, a mold having at least two parts movable toward and away from each other, the parts providing a mold cavity between them when they are together and allowing ejection of the molded part from such cavity when they are apart, a power operated crosshead mounting one of the mold parts for selectively moving the mold parts toward and away from each other, a plurality of ejector pins reciprocable in bores in a first one of said mold parts, said bores communicating with the mold cavity, said ejector pins comprising at least two sets of pins, the pins in each set being distributed generally over the area of the molded part, substantially all of the pins of both sets having at least one longitudinally disposed molding recess in their side surfaces, a first pin plate connecting the pins of the first set, a second pin plate connecting the pins of the second set, the two pin plates and their pins being capable of limited independent reciprocating motion relative to each other, a first lost-motion connection comprising means directly interposable between a stationary part of the framework of the apparatus and the first pin plate whereby upon a predetermined retraction of the crosshead to hold the first plate stationary whereby the pins of the first set are thrust outwardly of the first mold part, a second lost-motion connection between the first pin plate and the second pin plate whereby such ejecting motion of the first pin plate relative to the first mold part causes an equal relative motion in the same direction of the second pin plate, and a third lost-motion connection between the first pin plate and the second pin plate whereby upon a predetermined distance of travel of both sets of pins outwardly of the mold said last named connection causes the thrusting of the second plate toward the then stationary first plate thereby causing the pins of the second set to be thrust further outwardly of the first mold part than the pins of the first set.

References Cited in the file of this patent

UNITED STATES PATENTS

| | | |
|---|---|---|
| 2,301,819 | Sambrook | Nov. 10, 1942 |
| 2,302,367 | Ericson | Nov. 17, 1942 |
| 2,304,899 | Dupre | Dec. 15, 1942 |
| 2,483,093 | Harvey | Sept. 27, 1949 |
| 2,592,296 | Kutik | Apr. 8, 1952 |